(12) United States Patent
O'Connor et al.

(10) Patent No.: US 8,444,411 B2
(45) Date of Patent: May 21, 2013

(54) INCINERATOR FOR BOIL-OFF GAS

(76) Inventors: Simon Mark O'Connor, Poole (GB);
Richard James Price, Poole (GB);
Nigel Peter Webley, Ferndown (GB);
Mark Boss, Weymouth (GB)

(*) Notice: Subject to any disclaimer, the term of this patent is extended or adjusted under 35 U.S.C. 154(b) by 921 days.

(21) Appl. No.: 11/719,041

(22) PCT Filed: Nov. 14, 2005

(86) PCT No.: PCT/GB2005/004362
§ 371 (c)(1),
(2), (4) Date: May 10, 2007

(87) PCT Pub. No.: WO2006/051315
PCT Pub. Date: May 18, 2006

(65) Prior Publication Data
US 2008/0053349 A1    Mar. 6, 2008

(30) Foreign Application Priority Data
Nov. 12, 2004 (GB) .................................. 0424967.8

(51) Int. Cl.
*F23G 7/08* (2006.01)
(52) U.S. Cl.
USPC ........... 431/202; 431/243; 431/351; 431/354; 431/264; 110/345; 110/238; 110/235; 110/346; 60/39.23; 60/670; 60/737; 62/50.1; 34/479
(58) Field of Classification Search
USPC ............. 431/202, 243, 351, 353, 354, 5, 264, 431/329; 110/345, 238, 235, 346; 34/479; 62/50.1; 60/670, 39.23, 737
See application file for complete search history.

(56) References Cited

U.S. PATENT DOCUMENTS

| | | | | |
|---|---|---|---|---|
| 2,164,954 A * | 7/1939 | Stephens | ................... | 432/223 |
| 3,087,484 A * | 4/1963 | Eddy | ........................ | 126/92 B |
| 3,861,330 A * | 1/1975 | Santoleri | .................... | 110/244 |
| 4,044,099 A * | 8/1977 | Griffin | ....................... | 423/210 |
| 4,416,613 A * | 11/1983 | Barisoff | ..................... | 431/243 |
| 4,417,878 A * | 11/1983 | Koren | ............................ | 440/3 |
| 4,457,704 A * | 7/1984 | Sommers et al. | ............. | 432/29 |
| 4,785,748 A * | 11/1988 | Sujata et al. | ................. | 110/238 |
| 5,295,448 A * | 3/1994 | Vickery | ..................... | 110/214 |
| 5,319,923 A * | 6/1994 | Leonard et al. | ............. | 60/39.23 |
| 5,891,404 A * | 4/1999 | Ibaraki et al. | ................ | 422/182 |
| 5,950,417 A * | 9/1999 | Robertson et al. | ............ | 60/776 |
| 6,238,207 B1 * | 5/2001 | Sarkinen | ..................... | 431/353 |
| 6,478,576 B1 * | 11/2002 | Bradt et al. | .................. | 431/202 |
| 2004/0068993 A1 * | 4/2004 | Irie et al. | ..................... | 62/48.2 |

FOREIGN PATENT DOCUMENTS

JP    2005319862    * 11/2005

* cited by examiner

*Primary Examiner* — Avinash Savani
(74) *Attorney, Agent, or Firm* — Arthur Jacob

(57) ABSTRACT

An incinerator (20) for disposing of boil-off gas on an LNG carrier comprises a combustion section (40) wherein the boil-off gas admitted at (42) is burned in the presence of combustion air admitted at (44), producing a flame (46) and combustion products (C). Dilution air (A) is delivered into the combustion section (40) and mixed with the combustion products (C) to produce a diluted mixture (M). The combustion section (40) has an inner wall (48) and an outer wall (50) together defining a first passage (52) through which the dilution air (A) is passed before being mixed with the combustion products (C), whereby the dilution air A cools the combustion section (40). The dilution air A in the first passage (52) also provides a thermally insulating layer limiting radial heat transmission from the combustion section (40). A proportion ($A^P$) of the dilution air is mixed directly with the combustion products (C).

28 Claims, 2 Drawing Sheets

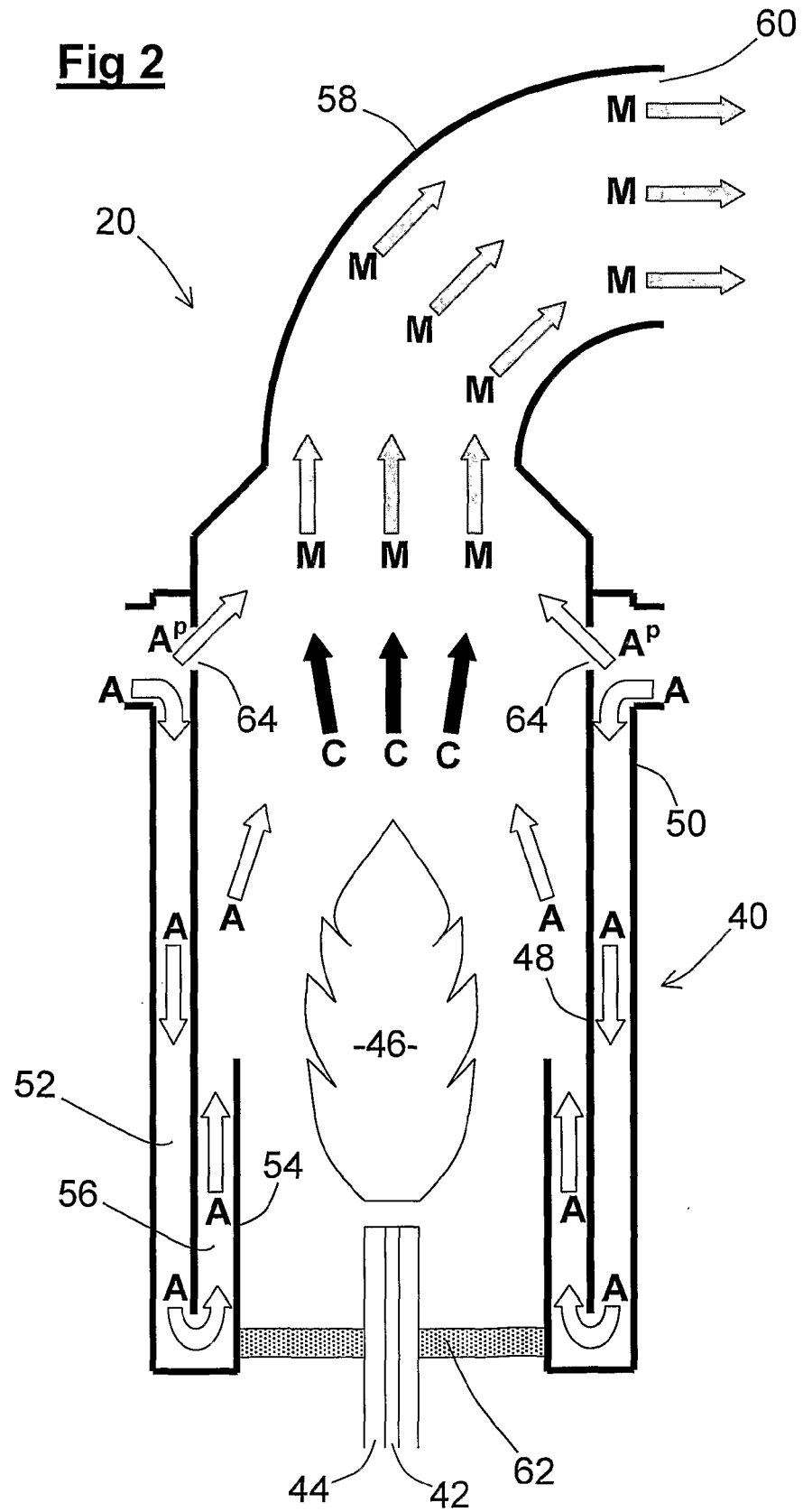

INCINERATOR FOR BOIL-OFF GAS

Figure 1:
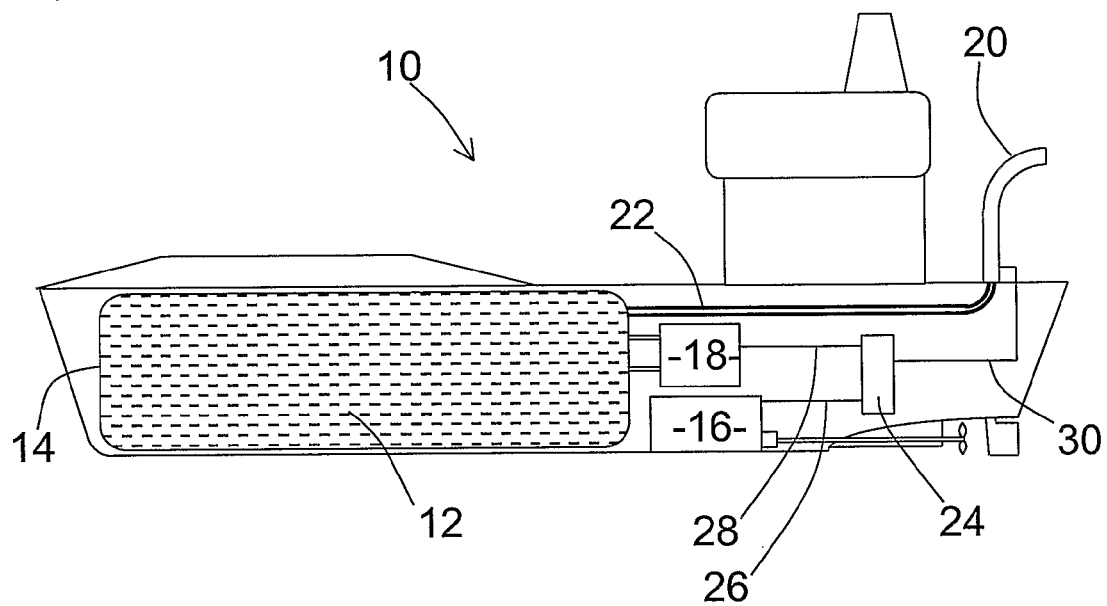

This invention concerns incinerators especially but not necessarily exclusively for disposing of boil-off gas on ships carrying cargoes of liquefied natural gas (LNG) by sea, such ships being commonly known as LNG carriers.

LNG has been carried by sea for more than forty years, and for all of that time most LNG carriers have been powered by steam turbines using boil-off gas from the cargo as a fuel. This boil-off gas was perceived to be essentially free, because it would otherwise be vented to the atmosphere and lost.

Commercial pressures now prompt a change. The shipping of LNG is becoming organised (and sometimes managed) as an operation distinct from production and supply, and needs to be individually accounted for. Boil-off gas is no longer regarded as free, and the emergence of a spot market in LNG emphasises the need for its carriage to be economical. And the steam propulsion traditionally used is less economical than other means of propulsion currently available, eg diesel engines or dual-fuel engines.

However, the adoption of a different means of propulsion raises another problem, in that the absence of boilers means there is no ready way of disposing of boil-off gas that cannot be reliquefied or otherwise used for propulsion or other purposes such as heating. Regulations no longer permit it to be vented to atmosphere as a standard fall-back procedure. This problem would be exceptionally serious—and dangerous—if at any time the engines failed.

In production facilities for both oil and gas it is known to dispose of unwanted gas by means of a flare burner. Such flare burners, however, cannot simply be mounted on an LNG carrier, for a number of reasons: they are bulky, they are noisy, they run very hot and they create a huge and highly visible flame, all of which (and especially the latter) would be alarming and possibly hazardous to the carrier's crew and other persons in the vicinity.

It is an object of the present invention to provide an LNG carrier with an effective and acceptable incinerator for disposing of boil-off gas.

Thus according to a first aspect of the invention there is provided an incinerator for disposing of boil-off gas on an LNG carrier, which incinerator comprises a combustion section wherein the boil-off gas is burned in the presence of combustion air and wherein dilution air is mixed with the combustion products, characterised in that before being mixed with the combustion products said dilution air is passed over the combustion section to cool the same.

In this application, the terms 'combustion air' and 'dilution air' are used with the following meanings. Combustion air is air admitted to a combustion section to provide oxygen for oxidation of the combustible components in the boil-off gas. (This may be stoichiometric, which is to say an amount providing the exact quantity of oxygen for complete oxidation, although combustion air usually—but not always—includes excess air over and above the calculated stoichiometric requirement). Dilution air is air admitted to the combustion section for cooling or quenching the products of combustion.

It should be noted at this point that in the present invention the dilution air (which may be delivered by a fan) serves to cool both the combustion section and the combustion products emanating from it, whereby the incinerator may safely be accommodated in the relatively limited space aboard a ship.

Preferably the combustion section has a wall formed with a first passage through which the dilution air is passed before admission to the combustion section. The incinerator may have an inner wall and an outer wall together defining said first passage. The first passage may comprise a plurality of channels. And preferably passage of the dilution air through the first passage is in counter-flow to the combustion products in the combustion section.

The combustion section may contain a flame shield within and spaced apart from the wall of the combustion section to define therewith a second passage communicating with the first passage at or near a proximal end and extending therefrom into the combustion section. Preferably there is a heat shield extending across the flame shield at or near its proximal end, and such heat shield may be formed of metal, eg such as a heat resistant alloy material. Alternatively the heat shield may comprise refractory material, and it is preferable that refractory material in the incinerator is substantially limited to said heat shield, because if refractory material is used extensively in a ship-board flare burner it is likely to be damaged by vibration and thus fall away, especially if applied to vertical surfaces.

The incinerator is preferably configured and arranged to contain all flame from the combustion (this being important to avoid causing alarm among persons in the vicinity, at least as much as for safety reasons). To this end the combustion section may extend generally vertically to a distal end, and it may be terminated at its distal end by a flue having a generally horizontal or inclined outlet.

The incinerator may include a fan operative to deliver the dilution air to the combustion section.

A proportion of the dilution air, perhaps about 50%, may be diverted to mix directly with said combustion products rather than being passed over the combustion section to cool the same.

Preferably there is no structural device within the combustion section for mixing the dilution air and the combustion products. By obviating such a mixing device, there is no structure within the combustion section exposed to the very hot combustion products and therefore liable to damage in use.

The invention extends to an LNG carrier including the incinerator. The LNG carrier may have a propulsion system operable using as a fuel boil-off gas not burnt in the incinerator, and such propulsion system may alternatively be operable using a fuel other than boil-off gas (ie as a dual-fuel system). Otherwise the LNG carrier may have a diesel or diesel-electric or gas turbine-electric propulsion system. The LNG carrier preferably includes an LNG liquefaction system, and also a control system operative to actuate the incinerator if the LNG liquefaction system or the propulsion system becomes inoperative.

In another aspect the invention provides a method of operating an incinerator (possibly but not necessarily for disposing of boil-off gas and possibly but not necessarily on board a ship), which method comprises delivering both combustion air and dilution air to the incinerator, characterised in that the dilution air cools the incinerator as well as mixing with the combustion products.

The dilution air may also thermally insulate the incinerator.

Preferably the dilution air is mixed fluidly with the combustion products, rather than by means of a structural mixing device within the combustion section.

The invention will now be described by way of example only with reference to the accompanying drawings, which are purely schematic and in which—

FIG. 1 is a vertical cross section through an LNG carrier embodying the present invention, viewed from the port beam, and FIG. 2 is a vertical cross section through an incinerator of the LNG carrier of FIG. 1, shown to a larger scale.

Referring first to FIG. 1, this shows an LNG carrier indicated generally at 10. The carrier 10 carries a cargo of LNG 12 contained in an insulated membrane tank (although this does not form part of the invention and may be replaced by spherical tanks of the so-called MOSS form). The carrier 10 is driven by a propulsion system 16 that in this case comprises diesel engines but which may otherwise be a diesel-electric system, a dual-fuel system or a steam-powered system. (It may be noted here that even where there is a steam boiler in which boil-off gas may be burnt, some further means of disposing of boil-off gas is required in case the boiler ceases to be usable for any reason).

Although the tank 14 is insulated, some of the cargo necessarily boils off during a voyage, and the carrier 10 is therefore equipped with a liquefaction plant 18, connected to the tank 14 and operative to reliquify the boil-off gas produced. The liquefaction plant is powered from the propulsion system 16, so that if this breaks down it is no longer possible to reliquify the boil-off gas. (Even if the liquefaction plant 18 is independently powered, a break down of the propulsion system 16 may be of such duration that the liquefaction plant 18 cannot cope with the demand). Accordingly the carrier 10 is provided with means for disposing of boil-off gas in the form of an incinerator 20. For simplicity of illustration the incinerator 20 is shown adjacent the stern of the ship 10, but those skilled in the science will appreciate that it may well be incorporated in the ship's funnel assembly or otherwise disposed.

The incinerator 20 is connected to the tank 14 by way of a gas line 22. A control system 24 is linked at 26 and 28 to each of the propulsion system 16 and the liquefaction system 18, and at 30 to the incinerator 20. In the event of failure of either the propulsion system 16 or the liquefaction system 18, the gas line 22 is opened and the incinerator 20 actuated to burn the boil-off gas. This means of disposing of the boil-off gas can be continued until repairs are made, or otherwise as long as necessary.

The construction and operation of the incinerator 20 will now be described in more detail with reference to FIG. 2. The gas line 22 delivers boil-off gas to a gas inlet 42 at the proximal (ie lower) end of a combustion section 40, which is generally cylindrical and extends vertically. Combustion air is blown into the combustion section 40 by way of an air inlet 44 and the air-gas mixture ignited (by means not detailed but which will be readily understood by those skilled in the science). Thus the boil-off gas burns as indicated at 46 and the combustion products flow upwards through the combustion section 40, as indicated by arrows C (shown black in FIG. 2).

It will be understood that the combustion process generates a great deal of heat, both radiant and convected, and the incinerator 20 includes five means whereby this is controlled, which five means will now be described.

First, the combustion section 40 has an inner wall 48 and an outer wall 50 which together define a generally annular first passage 52. A fan, not shown, delivers air to this first passage 52, and as indicated by arrows A (shown white in FIG. 2) this air is passed therethrough so as to cool the walls 48 and 50 of the combustion section 40. It will be noted that the air flows generally downward through the first passage 52, in the opposite direction from the generally upward flow of the combustion products, thus providing counterflow heat exchange.

Second, the air in the first passage 52 provides a thermally insulative layer around the combustion section 40, limiting radially outward heat transmission therefrom.

Third, a flame shield 54 is located within the combustion section 40 and spaced apart from its inner wall 48 so as to define a second passage 56. This second passage 56 is in communication with the first passage 52 at the proximal (lower) end of the combustion section 40 so as to receive the air passed therethrough. This air is thus turned at the lower end of the incinerator 20 and fed upwards into the combustion section 40 therein to mix with the combustion products. Accordingly the air dilutes and cools the combustion products, and the diluted mixture (indicated by grey arrows M) exhausts to atmosphere by way of a curved flue 58 having a generally horizontal outlet 60.

Fourth, a heat shield 62 extends across the lower end of the flame shield 54 to prevent excessive heating in this area of the incinerator 20 (where the gas is delivered). The heat shield 62 comprises refractory material—the only refractory material in the incinerator 20. Alternatively it may be formed of suitably heat resistant metal alloy (in which case the incinerator 20 is formed substantially entirely of metal).

And fifth, a proportion $A^P$ of the dilution air is diverted through ports 64 in the upper part of the combustion section 40 and then mixed directly with the combustion products C. It should be noted that the ports 64 may be nozzles or any other convenient form, but an important feature of the invention is that the dilution air A and the combustion products C are mixed entirely fluidly. That is to say, there is no structural mixing device exposed to the combustion products C. Where, as is conventional, there is a structural mixing device within the combustion section, this necessarily gets very hot in use. To resist this heat, such mixing devices commonly employ refractory material. If there is a power failure during use, causing the incinerator to stop working, this very hot mixing device becomes itself a serious hazard, especially when made of refractory material, which is heat-retentive (whereas, of course, the incinerator is intended to contribute to safety). To combat this, it has been proposed to drench the mixing device with water in the event of power failure, but those skilled in the science will appreciate that thermal shock is likely to result in serious damage to the mixing device, particularly if of refractory material. By obviating any structural mixing device within the combustion section, the present invention avoids all these problems.

Other advantages of the present invention may now be noted.

First, on a ship, there is inevitably a considerable amount of vibration, not least from the propulsion system, which is likely to damage refractory material or similar forms of thermal insulation. Hitherto it has been common practice to insulate the walls of an incinerator with refractory material, but this cannot be expected to remain in place over long periods. Where refractory material is used in the present invention in the heat shield 62, this is limited, horizontally disposed and well supported, so that vibration will have little effect. Otherwise a substantially all-metal construction is possible, facilitating fabrication and offering an improved working life.

Second, by mixing dilution air with the combustion products, the combustion products are rapidly cooled. Thus the flue can be relatively short. Counter-flow heat exchange also allows reduced length in comparison with parallel-flow. Thus a flare burner according to the invention can be fitted on an LNG carrier whilst still being configured and arranged to contain all flame from the combustion process.

Finally, the dilution air to be mixed with the combustion products is first used to cool the walls of the flame burner. Thus the process is efficient as well as effective, needing no additional cooling mechanism.

It will now be appreciated that the invention has particular advantages when applied to the disposal of boil-off gas on an LNG carrier. However it should be noted that its underlying mode of operation, in which dilution air is used for cooling and for thermal insulation as well as for mixing with the combustion products, may well have benefits elsewhere, not necessarily for disposing of LNG boil-off and not necessarily aboard a ship. For instance, the invention might be used in an air heater for supply air at a uniform temperature to a steam generator. Other applications, and modifications of the arrangements described herein, will be apparent to those skilled in the science.

The invention claimed is:

1. An incinerator for disposing of boil-off gas on an LNG carrier, which incinerator comprises a wall defining a combustion section extending from a proximal end to a distal end wherein the boil-off gas is burned in a stream of combustion air admitted into the combustion section at the proximal end of the combustion section, thereby forming combustion products, and wherein non-combustion dilution air is admitted into the combustion section between the proximal end and the distal end of the combustion section in a stream of non-combustion dilution air separate from the stream of combustion air and subsequently is mixed with the combustion products, wherein the incinerator is configured and arranged so that before being mixed with the combustion products said non-combustion dilution air is admitted into the combustion section separate from the combustion products for being passed along the combustion section between the wall and the combustion products and contiguous with the combustion products for diluting and cooling the combustion products separating the combustion products from the wall to cool the wall.

2. An incinerator as claimed in claim 1 wherein said wall is formed with a first passage through which the dilution air is passed before admission to the combustion section.

3. An incinerator as claimed in claim 2 wherein said combustion section has an inner wall and an outer wall together defining said first passage.

4. An incinerator as claimed in claim 2 wherein the passage of the dilution air through the first passage is in counter-flow to the combustion products in the combustion section.

5. An incinerator as claimed in claim 2 wherein the combustion section contains a flame shield within and spaced apart from the wall of the combustion section to define therewith a second passage communicating with the first passage at or near a proximal end and extending therefrom into the combustion section.

6. An incinerator as claimed in claim 5 wherein the combustion section has a heat shield extending across the flame shield at or near its proximal end.

7. An incinerator as claimed in claim 6 wherein said heat shield is formed of metal.

8. An incinerator as claimed in claim 7 wherein said metal comprises a heat resistant alloy material.

9. An incinerator as claimed in claim 6 wherein said heat shield comprises refractory material.

10. An incinerator as claimed in claim 9 wherein refractory material in the incinerator is substantially limited to said heat shield.

11. An incinerator as claimed in claim 1 configured and arranged to contain within the combustion section all flame resulting therein from combustion of the boil-off gas.

12. An incinerator as claimed in claim 11 wherein said combustion section extends generally vertically upwards to a distal end.

13. An incinerator as claimed in claim 12 wherein said combustion section is terminated at its distal end by a flue having a non-vertical outlet.

14. An incinerator as claimed in claim 1 including a fan operative to deliver the dilution air to the combustion section.

15. An incinerator as claimed in claim 1 wherein a proportion of the dilution air is diverted to mix directly with said combustion products rather than being passed over the combustion section to cool the same.

16. An incinerator as claimed in claim 15 wherein said proportion is substantially 50%.

17. An incinerator as claimed in claim 1 wherein the dilution air is mixed fluidly with the combustion products.

18. An LNG carrier including an incinerator as claimed in claim 1.

19. An LNG carrier as claimed in claim 18 including a propulsion system operable using as a fuel boil-off gas not burnt in the incinerator.

20. An LNG carrier as claimed in claim 19 wherein said propulsion system is alternatively operable using a fuel other than boil-off gas.

21. An LNG carrier as claimed in claim 18 including a propulsion system operable using a fuel other than boil-off gas.

22. An LNG carrier as claimed in claim 21 including an LNG liquefaction system.

23. An LNG carrier as claimed in claim 22 including a control system operative to actuate the incinerator if the LNG liquefaction system becomes inoperative and if the propulsion system becomes inoperative.

24. A method of operating an incinerator for disposing of boil-off gas, which method comprises providing in the incinerator a combustion section defined by a wall within which combustion section the boil-off gas is burned in the presence of combustion air thereby forming combustion products, delivering the combustion air into a proximal end of the combustion section in a stream of combustion air to mix with the boil-off gas, and delivering into the combustion section non-combustion dilution air admitted into the combustion section between the proximal end and a distal end of the combustion section in a stream of non-combustion dilution air separate from the stream of combustion air, which non-combustion dilution air is passed along the combustion section between the wall and the combustion products and contiguous with the combustion products for diluting and cooling the combustion products while separating the combustion products from the wall to cool the wall, and thereafter further mixing the non-combustion dilution air with the combustion products.

25. A method of operating an incinerator as claimed in claim 24 wherein the dilution air also thermally insulates the incinerator.

26. A method of operating an incinerator as claimed in claim 24 wherein some of the dilution air is passed over the combustion section to cool the same and some of the dilution air is diverted to mix directly with said combustion products.

27. A method of operating an incinerator as claimed in claim 26 wherein substantially 50% of the dilution air is passed over the combustion section to cool the same and the remainder of the dilution air is diverted to mix directly with said combustion products.

28. A method of disposing of boil-off gas as claimed in claim 24 wherein the dilution air is mixed entirely fluidly with the combustion products.

* * * * *